United States Patent
Whelan (10) Patent No.: US 10,332,414 B2
(45) Date of Patent: Jun. 25, 2019

(54) SOUND GENERATOR FOR VIRTUAL SWITCHES IN A SIMULATOR

(71) Applicant: The Boeing Company, Chicago, IL (US)

(72) Inventor: John Desmond Whelan, Burien, WA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 14/989,009

(22) Filed: Jan. 6, 2016

(65) Prior Publication Data

US 2017/0193840 A1 Jul. 6, 2017

(51) Int. Cl.
| | |
|---|---|
| *G09B 9/52* | (2006.01) |
| *G06F 3/16* | (2006.01) |
| *G09B 9/05* | (2006.01) |
| *G09B 9/06* | (2006.01) |
| *G09B 9/12* | (2006.01) |
| *G09B 9/22* | (2006.01) |
| *G09B 9/30* | (2006.01) |

(52) U.S. Cl.
CPC ............... *G09B 9/52* (2013.01); *G06F 3/165* (2013.01); *G09B 9/05* (2013.01); *G09B 9/063* (2013.01); *G09B 9/12* (2013.01); *G09B 9/22* (2013.01); *G09B 9/30* (2013.01)

(58) Field of Classification Search
CPC ........................................................ G09B 9/52
USPC ............................................................ 434/34
See application file for complete search history.

(56) References Cited

FOREIGN PATENT DOCUMENTS

CN 101251959 B 12/2010

OTHER PUBLICATIONS

Muzychenko, "Virtual Audio Cable—Latest Version 4.15," Eugene Muzychenko, copyright 2005-2015, 9 pages, accessed Jan. 5, 2016. http://software.muzychenko.net/eng/vac.htm.
Rosato, "How to create a virtual audio device and stream audio input with it," superuser.com, Mar. 2010, 3 pages, accessed Jan. 5, 2016. http://superuser.com/questions/117625/how-to-create-a-virtual-audio-device-and-stream-audio-input-with-it.

*Primary Examiner* — Kesha Frisby
(74) *Attorney, Agent, or Firm* — Yee & Associates, P.C.

(57) ABSTRACT

A method and apparatus for managing a simulation. The method comprises detecting a user input manipulating a virtual control on a control panel displayed in a target output location on a display system in a simulator during the simulation of a platform. Further, the method comprises identifying a sound for the virtual control when the user input is detected. Still further, the method comprises controlling a speaker system to output the sound identified during the simulation in a manner that is perceived by a human operator to be from the target output location.

24 Claims, 6 Drawing Sheets

SOUND GENERATOR FOR VIRTUAL SWITCHES IN A SIMULATOR

BACKGROUND INFORMATION

1. Field

The present disclosure relates generally to simulation systems and, in particular, to a method and apparatus for generating sounds in a simulation system. Still more particularly, the present disclosure relates to a method and apparatus for generating sounds for virtual switches in a simulation system.

2. Background

Simulation systems provide simulations for operating various types of platforms. For example, aircraft simulation systems are commonly used to train pilots to fly a particular type of aircraft. Additionally, aircraft simulation systems are also used to test new flight components or different configurations of components for the flight deck of an aircraft.

The aircraft simulation system re-creates the operation and/or flight of an aircraft and the environment in which the aircraft flies. The aircraft simulation system often has a compartment in which a human operator may be located during the simulation. This compartment is one in which the human operator may interact with different components in the flight deck of an aircraft for which flight is being simulated.

Many aircraft simulation systems use virtual switches instead of physical switches. The virtual switches allow for changing the configuration and testing new components more easily than re-configuring physical switches.

One technical problem with virtual switches is that the virtual switches often lack a desired level of realism for a user in simulating the flight or other operation of an aircraft. The operation of the aircraft may include an operation in which the aircraft is not in flight. For example, virtual switches may be displayed on a touchscreen. The touchscreen allows for the switches to be manipulated. However, these virtual switches lack features to make the switches seem like real physical switches. For example, the virtual switches lack features, such as the texture, shadowing, and feel of a physical switch corresponding to the virtual switch being simulated. Additionally, the sound that a physical switch makes is not re-created in a desired manner for realism using virtual switches in current simulators.

Therefore, it would be desirable to have a method and apparatus that take into account at least some of the issues discussed above, as well as other possible issues. For example, it would be desirable to have a method and apparatus that overcome a technical problem with providing a desired level of realism in simulating the flight or other operation of an aircraft.

SUMMARY

An aspect of the present disclosure provides a simulation system. The simulation system comprises a display system, a speaker system, and a simulation controller. The display system has a target output location at which a control panel is displayed for a simulation of a platform. The simulation controller detects a user input manipulating a virtual control on the control panel during the simulation of the platform. Further, the simulation controller identifies a sound for the virtual control when the user input is detected. Still further, the simulation controller controls the speaker system to output the sound identified during the simulation in a manner that is perceived by a human operator to be from the target output location.

Another aspect of the present disclosure provides an aircraft simulation system. The aircraft simulation system comprises a flight deck simulator, a display system associated with an interior of the flight deck simulator, a speaker system, and a simulation controller. The flight deck simulator has a configuration that holds a human operator for a simulation of an aircraft. The display system has a target output location at which a control panel is displayed for the simulation of the aircraft. The simulation controller detects a user input manipulating a virtual control on the control panel during the simulation of the aircraft. Further, the simulation controller identifies a sound for the virtual control, wherein the sound is one made by a manipulation of a physical version of the virtual control, controlling the speaker system to output the sound in a manner that is perceived by the human operator to be from the target output location where the control panel is displayed.

Yet another aspect of the present disclosure provides a method for managing a simulation. The method comprises detecting a user input manipulating a virtual control on a control panel displayed in a target output location on a display system in a simulator during the simulation of a platform. Further, the method comprises identifying a sound for the virtual control when the user input is detected. Still further, the method comprises controlling a speaker system to output the sound identified during the simulation in a manner that is perceived by a human operator to be from the target output location.

The features and functions can be achieved independently in various aspects of the present disclosure or may be combined in yet other aspects in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives, and features thereof, will best be understood by reference to the following detailed description of an illustrative example of the present disclosure when read in conjunction with the accompanying drawings, wherein:

DETAILED DESCRIPTION

The illustrative example recognize and take into account one or more different considerations. For example, the illustrative examples recognize and take into account that currently available simulation systems do not provide sound for virtual controls, such as switches, displayed on a display system inside of an aircraft simulation system. The illustrative examples recognize and take into account that it would be desirable to increase the realism of the simulation by providing sounds, including those from the movement of virtual controls displayed on the display system. These virtual controls include, for example, at least one of a switch, a toggle, a push button, a pull-out button, a selector switch, a vertical slider, a horizontal slider, a vertical lever, a horizontal lever, a rotary knob, and a three-way switch.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative examples recognize and take into account that one solution may involve integrating a sound mechanism into the display panels in a display system on which the virtual controls, e.g., virtual switches, are displayed. This type of solution may provide the desired sound when the virtual switches are actuated. The illustrative examples, however, recognize and take into account that the cost for a sound mechanism may be greater than desired. Further, with integrating a sound mechanism for creating switch sounds in the display panels, the flexibility of changing how many or which virtual switches are present may be less than desired.

The illustrative examples also recognize and take into account that one manner in which increased realism for a virtual switch may be accomplished includes sending the sound for the virtual switch into the simulator from the computer system in the simulation system. The illustrative examples also recognize and take into account that this solution may result in other sounds being sent that are not a part of the simulation. For example, the illustrative examples recognize and take into account that sounds from the operating system and other applications that are not a part of the simulation may also be heard when sounds are sent from the hardware to the simulator, which can detract from the desired realism of the simulation.

Thus, those examples provide a method and apparatus for managing a simulation and, in particular, for managing sounds from virtual controls that are simulated in a simulation. A user input manipulating a virtual control on a control panel displayed in a target output location on a display system in a simulator is detected during the simulation of a platform. A sound for the virtual control is identified when the user input is detected. A speaker system is controlled to output the sound identified during the simulation in a manner that is perceived by a human operator to be from the target output location.

In one illustrative example, the sound for the control is assigned to a channel in managing sounds unrelated to the simulation. The levels of the channels may be controlled such that other sounds that are not a part of the simulation are excluded, such as an operating system startup chime.

Figure 1:
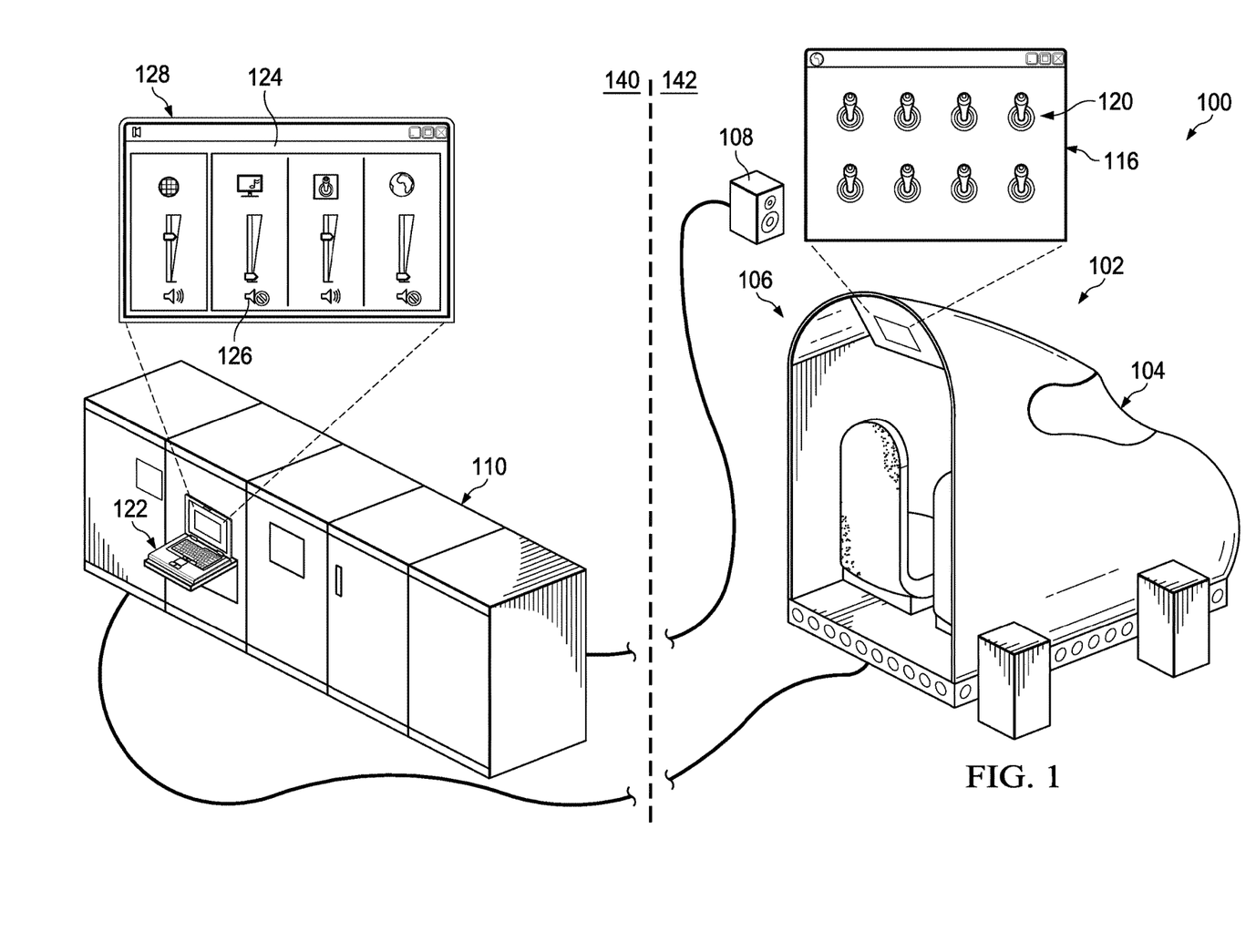
FIG. 1 is a pictorial illustration of a simulation environment in accordance with an illustrative example.

With reference to FIG. 1, a pictorial illustration of a simulation environment is depicted in accordance with an illustrative example. As depicted in this example, simulation environment 100 includes simulation system 102, which simulates the flight or other operation of an aircraft. Simulation system 102 may be used for pilot training, aircraft design testing, or other suitable purposes.

In this illustrative example, simulation system 102 includes a number of different components. As depicted, simulation system 102 includes simulator 104, display system 106, speaker 108, and hardware 110.

As depicted, simulator 104 is a structure with a compartment providing an interior that is configured to resemble a flight deck of an aircraft. In this example, simulator 104 is a flight deck simulator. One or more human operators may be located within the compartment during the simulation. In this illustrative example, simulator 104 may be configured to move and change orientation to provide additional realism in the simulation of the operation of the aircraft.

As depicted in this view, display system 106 includes touchscreen 116. Touchscreen 116 is located inside of simulator 104 and takes the form of an overhead panel. Touchscreen 116 displays virtual controls, e.g., virtual switches 120 inside of simulator 104. Virtual switches 120 represent physical switches that would actually be present on the flight deck of an aircraft. A human operator may interact with touchscreen 116 to manipulate one or more of virtual switches 120. The virtual controls may take other forms in addition to or in place of virtual switches. The virtual controls may also include toggles, push buttons, pull-out buttons, vertical sliders, horizontal sliders, vertical levers, horizontal levers, rotary knobs, or other suitable virtual controls that simulate physical controls.

As depicted, speaker 108 is in a location proximate to touchscreen 116 in this illustrative example. Speaker 108 outputs sound for the virtual switches 120 during the simulation.

Hardware 110 includes one or more computers and other hardware components that control the operation of the different components in simulation system 102. For example, hardware 110 controls the operation of simulator 104, display system 106, and speaker 108. For example, hardware 110 controls aspects of the aircraft in the simulation as well as mimicking the environment outside of the aircraft.

As depicted, hardware 110 is in location 140, while simulator 104, display system 106, and speaker 108, are in location 142. Location 140 may be in one room, while location 142 is in another room. Further, location 140 and location 142 may be in different buildings, cities, or other geographic locations.

In controlling the operations of these different components, hardware 110 performs a simulation for the operation of an aircraft. The operation may be for at least one of at the gate, taxiing, takeoff, ascent, cruising, descent, landing, or some other suitable phase of the operation of the aircraft wherein the aircraft may be on the ground or in flight.

During the simulation, hardware 110 controls the output of sound through speaker 108. In the illustrative example, hardware 110 provides an ability to generate an audible sound for virtual switches 120 through software that simulates actual switches.

As depicted, hardware 110 controls the output of sound from speaker 108 when a human operator manipulates one or more of virtual switches 120 displayed on touchscreen 116. The sound output through speaker 108 is such that the human operator hears the sounds made by virtual switches 120 as if virtual switches 120 were actual physical switches.

In this illustrative example, computer 122 includes volume mixer 124 that may modify and output sound generated by a user input to a switch in virtual switches 120. Volume mixer 124 is implemented in software, hardware, or some combination thereof. In this illustrative example, controls 126 are displayed in graphical user interface 128 for volume mixer 124. Volume mixer 124 allows for the sound to be output to speaker 108. The program code, hardware, or a combination thereof for volume mixer 124 is not shown in this illustration.

As depicted, the sound for a virtual switch may be in a channel controlled by volume mixer 124. In this manner, hardware 110 may reduce or eliminate other sounds that are not a part of the simulation being output through speaker 108. For example, operating system sounds and sounds from other applications that are not a part of the simulation may be reduced or turned off.

In this manner, hardware 110 may increase the realism of the simulation using simulation system 102. By adding sound to virtual switches 120 displayed on touchscreen 116, increased realism of a flying experience may occur.

The illustration of simulation environment 100 in FIG. 1 is not meant to limit the manner in which other simulation environments may be implemented. For example, hardware 110, simulator 104, display system 106, and speaker 108 may all be in the same location. As another example, another simulator, display system, and speaker, in addition to simulator 104, display system 106, and speaker 108, may be present, which are also controlled by hardware 110.

Figure 2:
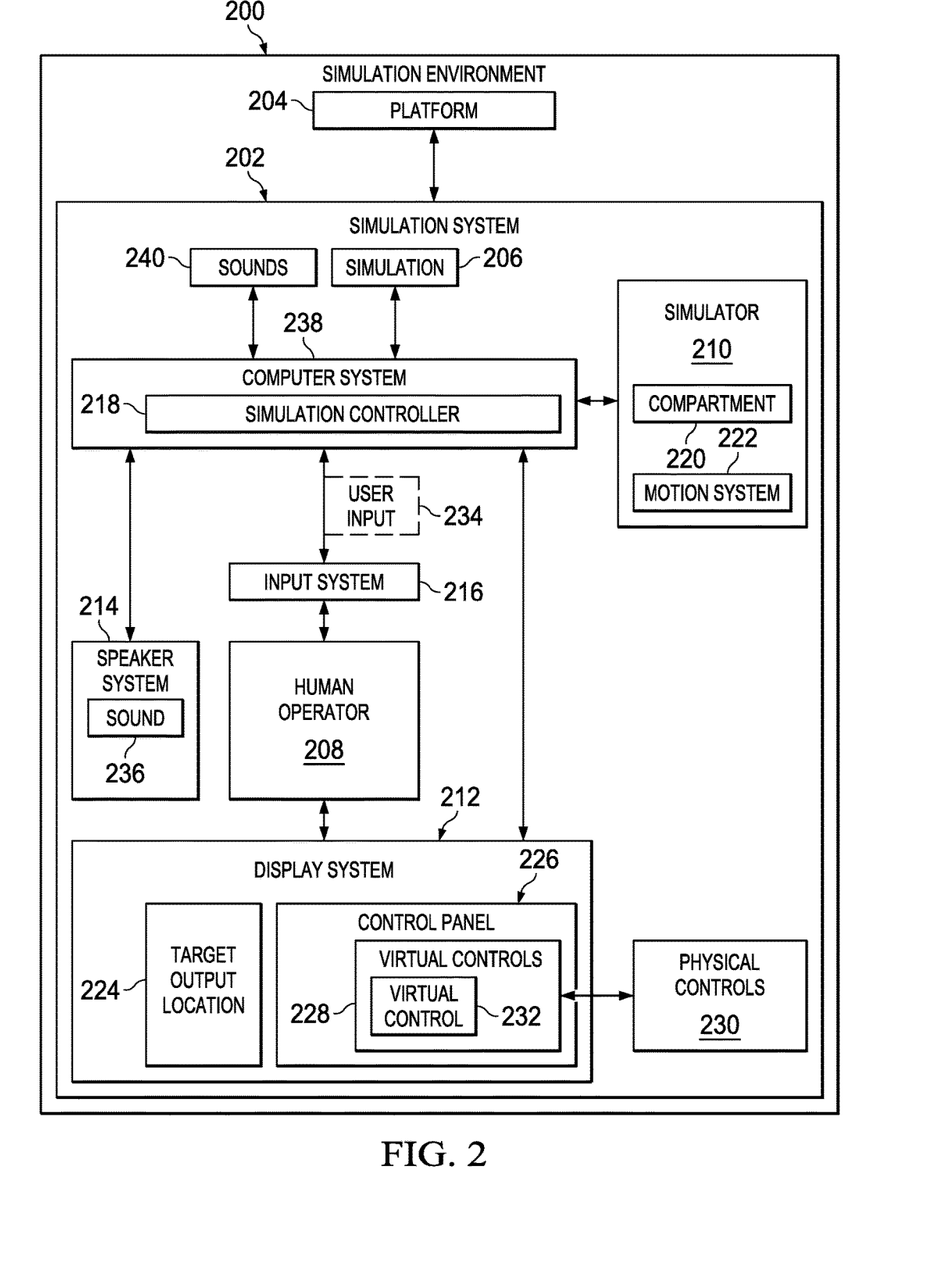
FIG. 2 is an illustration of a block diagram of a simulation environment in accordance with an illustrative example.

With reference to FIG. 2, an illustration of a block diagram of a simulation environment is depicted in accordance with an illustrative example. Simulation environment 100 in FIG. 1 is an example of one implementation of simulation environment 200 shown in block form in this figure.

In this illustrative example, simulation environment 200 contains simulation system 202 for platform 204. Simulation system 202 runs simulation 206 in a manner that provides human operator 208 an imitation of a real world system for platform 204.

In this illustrative example, platform 204 may take various forms. For example, platform 204 may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a manufacturing facility, a building, or some other suitable platform. When platform 204 is an aircraft, simulation system 202 is an aircraft simulation system.

Simulation system 202 is comprised of a number of different components. As depicted, simulation system 202 includes simulator 210, display system 212, speaker system 214, input system 216, and simulation controller 218.

Simulator 210 is a physical hardware system and has a shape that holds human operator 208 inside simulator 210 for simulation 206 of platform 204. In this illustrative example, simulator 210 includes compartment 220 and motion system 222.

Compartment 220 is a structure that provides a location in which human operator 208 interacts with simulation 206. For example, compartment 220 may be configured to re-create a flight deck for an aircraft, a control center for a power plant, a control stand inside a train, an aircraft control station, or some other suitable location. Compartment 220 may be partially or fully enclosed.

In this illustrative example, motion system 222 is configured to move and change the orientation of compartment 220 to provide additional realism in simulation 206 of the operation of platform 204. For example, when platform 204 is an aircraft, motion system 222 may move and change orientation of compartment 220 to simulate takeoff, landing, and other situations in which compartment 220 may have different orientations. The movement provided by motion system 222 may also simulate vibrations occurring from the operation of the aircraft, turbulence from weather conditions, or other conditions.

In this illustrative example, display system 212 is a physical hardware system and includes one or more display devices. The display devices may include at least one of a light emitting diode (LED) display, a liquid crystal display (LCD), an organic light emitting diode (OLED) display, or some other suitable display device. These different display devices may be located inside of simulator 210.

In this illustrative example, display system 212 includes target output location 224. Target output location 224 is a location at which control panel 226 is displayed for simulation 206 of platform 204. In this illustrative example, control panel 226 is displayed inside of compartment 220 for simulator 210. Control panel 226 is an area where virtual controls 228 may be displayed in display system 212. The area may include a visible border defining the area or may just include virtual controls 228 without a border.

For example, a group of virtual controls 228 is displayed on control panel 226. The group of virtual controls 228 simulates physical controls 230 that are actually used in the real world. For example, virtual controls 228 may be graphical representations of mechanical controls. When platform 204 takes the form of an aircraft, control panel 226 may be located inside of simulator 210.

The use of the group of virtual controls 228 increases the flexibility in performing simulation 206. For example, when simulation 206 simulates different types of equipment for platform 204, the group of virtual controls 228 may be changed to reflect the controls for the equipment that may be tested for platform 204.

As used herein, "a group of", when used with reference to items, means one or more items. For example, "a group of virtual controls 228" is one or more of virtual controls 228.

The group of virtual controls 228 may take a number of different forms. For example, virtual control 232 in the group of virtual controls 228 may be selected from one of a switch, a toggle, a push button, a pull-out button, a selector switch, a vertical slider, a horizontal slider, a vertical lever, a horizontal lever, a rotary knob, a three-way switch, and some other suitable types of virtual controls.

Speaker system 214 outputs sounds 240 for simulation 206. Speaker system 214 is a hardware system and includes one or more components. For example, speaker system 214 may include one or more speakers, amplifiers, and other suitable types of devices for outputting sounds 240. The different components in speaker system 214 may be in locations selected from at least one of inside of or outside of simulator 210.

In the illustrative example, simulation controller 218 controls the performance of simulation 206 by simulation system 202. Simulation controller 218 controls components, such as simulator 210, display system 212, and speaker system 214.

As depicted, simulation controller 218 detects user input 234 manipulating virtual control 232 on control panel 226 during simulation 206 of platform 204. User input 234 may be generated by input system 216 that is being controlled by human operator 208.

Input system 216 is a hardware system including a group of input devices. User input 234 may be generated from a group of input devices selected from at least one of a mouse, a keyboard, a trackball, a touchscreen, a stylus, a motion sensing input device, a cyberglove, or some other suitable type of input device.

In this illustrative example, simulation controller 218 identifies sound 236 for virtual control 232 when user input 234 is detected. Simulation controller 218 controls speaker system 214 to output sound 236 identified during simulation 206 in a manner that is perceived by human operator 208 to be from target output location 224.

Sound 236 may be, for example, a mechanical sound made by a physical control simulated by virtual control 232. In another example, sound 236 may be a beep, a tone, or some other sound that brings the attention of human operator 208 to target output location 224.

Simulation controller 218 may be implemented in software, hardware, firmware, or a combination thereof. When software is used, the operations performed by simulation controller 218 may be implemented in program code configured to run on hardware, such as a processor unit. When firmware is used, the operations performed by simulation controller 218 may be implemented in program code and data and stored in persistent memory to run on a processor unit. When hardware is employed, the hardware may include circuits that operate to perform the operations in simulation controller 218.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, simulation controller 218 is located in computer system 238. As depicted, computer system 238 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with providing a desired level of realism in simulating the operation of an aircraft. As a result, one or more technical solutions may provide a technical effect of outputting sounds 240 in a manner that increases the realism of simulation 206. For example, sound 236 is output at target output location 224 in a manner that increases the realism of virtual control 232 that is displayed at target output location 224.

In this manner, simulation controller 218 may operate to enhance the realism and authenticity of the user experience in simulation 206. Sound 236 may help increase the realism of virtual controls 228 displayed on control panel 226. Sound 236 may help make up for a lack of features, such as the texture, shadowing, and feel of physical controls 230 when virtual controls 228 are displayed on control panel 226 in display system 212. With one or more technical solutions, a psychoacoustic effect may occur, thus increasing the realism of virtual controls 228 in simulation 206 for human operator 208.

As a result, computer system 238 operates as a special purpose computer system in which simulation controller 218 in computer system 238 enables output of sound 236 at target output location 224 using speaker system 214. In particular, simulation controller 218 transforms computer system 238 into a special purpose computer system, as compared to currently available general computer systems that do not have simulation controller 218.

Figure 3:
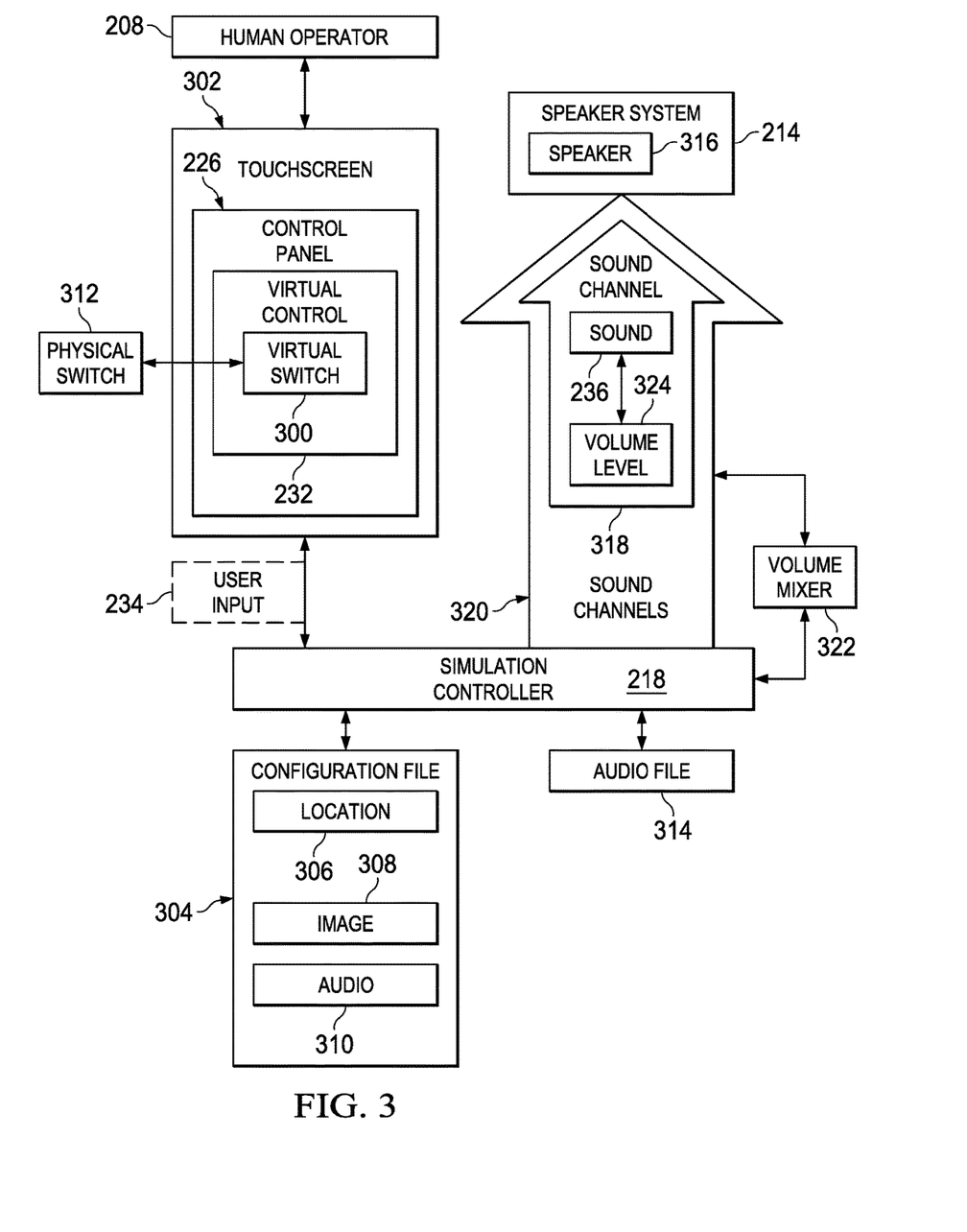
FIG. 3 is an illustration of dataflow that occurs in outputting a sound for a virtual control in accordance with an illustrative example.

With reference to FIG. 3, an illustration of dataflow that occurs in outputting a sound for a virtual control is depicted in accordance with an illustrative example. In the illustrative examples, the same reference numeral may be used in more than one figure. This reuse of a reference numeral in different figures represents the same element in the different figures.

As depicted, simulation controller 218 displays virtual control 232 in the form of virtual switch 300 on control panel 226 of touchscreen 302 in simulator 210 in FIG. 2. Touchscreen 302 functions as a display device in display system 212 and also functions as an input device in input system 216 in FIG. 2. For example, touchscreen 302 receives user input 234. User input 234 is sent to simulation controller 218.

In response to detecting user input 234 that is manipulating virtual control 232, simulation controller 218 identifies sound 236 for virtual control 232. In this illustrative example, sound 236 is identified using configuration file 304.

As depicted, configuration file 304 includes information about virtual control 232. This information may include, for example, location 306, image 308, audio 310, and other suitable information that may be used to simulate physical switch 312 using virtual control 232.

As depicted, location 306 may be the coordinates of where virtual control 232 is displayed on touchscreen 302. Image 308 may identify one or more images that are used to display virtual control 232 on touchscreen 302.

In this illustrative example, audio 310 identifies sound 236. For example, audio 310 may indicate audio file 314 should be used to output sound 236. For example, audio 310 may include a file name, a path, a universal resource locator, or some other suitable information for finding audio file 314.

Simulation controller 218 selects audio file 314 using audio 310 in configuration file 304 and sends sound 236 that is generated using audio file 314 to speaker 316 in speaker system 214 over sound channel 318. As depicted, volume mixer 322 controls the volume level for sound channels 320. For example, volume mixer 322 sets the level of sound 236 on sound channel 318 in sound channels 320.

The settings for the volume level of sounds over sound channels 320 are controlled by simulation controller 218. Simulation controller 218 controls sound channels 320 using volume mixer 322 in a manner that excludes a group of sounds 240 in FIG. 2 that is not a part of simulation 206 in FIG. 2 when controlling speaker 316 to output sound 236 for virtual control 232.

Simulation controller 218 controls volume mixer 322 for sound channels 320 to output sound 236 over sound channel 318 with volume level 324, such that sound 236 for virtual control 232 is perceived by human operator 208 to originate from the location at which virtual control 232 is displayed. The perception that sound 236 for virtual control 232 is from target output location 224 on control panel 226 for virtual control 232 may be implemented in a number of different ways.

For example, a group of speakers in speaker system 214 may be located proximate to target output location 224. The location is such that sound 236 is perceived to be from virtual control 232 when sound 236 is output from the group of speakers when simulation controller 218 outputs sound 236 to the group of speakers based on the location of the group of speakers. For example, the group of speakers may be located behind a display device in display system 212 in FIG. 2 that displays control panel 226.

In another illustrative example, simulation controller 218 may employ a virtual surround system to output sound 236 from speaker system 214 in the manner that is perceived by human operator 208 to be from target output location 224. A virtual surround system is an audio system that creates a perception that there are more sources of sound 236 than are actually present. In other words, this type of system may cause human operator 208 to think that sound 236 is coming from a location where a speaker is not present. With this example, increased flexibility in relocating virtual controls 228 may be present.

The illustration of simulation environment 200 and the different components in FIG. 2 and in FIG. 3 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, simulation controller 218 may be used with one or more simulators in addition to or in place of simulator 210 in FIG. 2. As another example, a display other than touchscreen 302 may be used. In this type of implementation, user input 234 may be made using an input device, such as a mouse, a cyberglove, a keyboard, or some other suitable type of input device.

In another illustrative example, one or more human operators in addition to human operator 208 may be present within simulator 210 during simulation 206. As yet another illustrative example, computer system 238 including simulation controller 218 may be physically associated with simulator 210. For example, computer system 238 is formed as a part of or attached to simulator 210.

In yet another illustrative example, simulator 104 in FIG. 1 may include a structure in addition to or in place of compartment 220. For example, simulator 104 may have a structure or platform that human operator 208 is located on instead of being inside of compartment 220 for simulation 206. Motion system 222 may be omitted in some illustrative examples.

Figure 4:
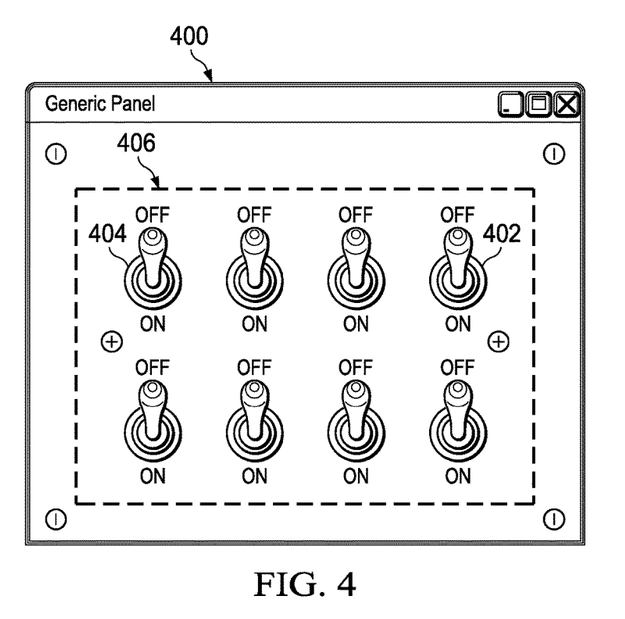
FIG. 4 is an illustration of an example of virtual switches in accordance with an illustrative example.

With reference next to FIG. 4, an illustration of an example of virtual switches is depicted in accordance with an illustrative example. As depicted, control panel 400 with virtual switches 402 is an example of control panel 226 with virtual controls 228 displayed on display system 212 shown in block form in FIG. 2.

Virtual switches 402 are a graphical representation of physical switches in the form of toggle switches. Virtual switches 402 are displayed in a manner to realistically represent physical switches. The use of virtual switches 402 allow for flexibility in changing configurations of switches when testing new components. In this example, virtual switch 404 of virtual switches 402 is displayed on target output location 406. Target output location 406 is shown as the area in control panel 400, but may be a smaller portion of control panel 400, depending on the size of control panel 400. In the illustrative examples, a sound for virtual switch 404 is output such that the sound is perceived to originate from target output location 406.

When a human operator toggles one of virtual switches 402, software that is controlling the mechanics of that virtual switch activates an [stateChanged] event. In this example, the software may be located in simulation controller 218. This event signals that the state of the virtual switch has changed from one position to another position. Code is present to generate a "mechanical click" sound for the movement of the virtual switch. The code may be located, for example, within this event, within the definition of the virtual switch itself, or in some other location.

Figure 5:
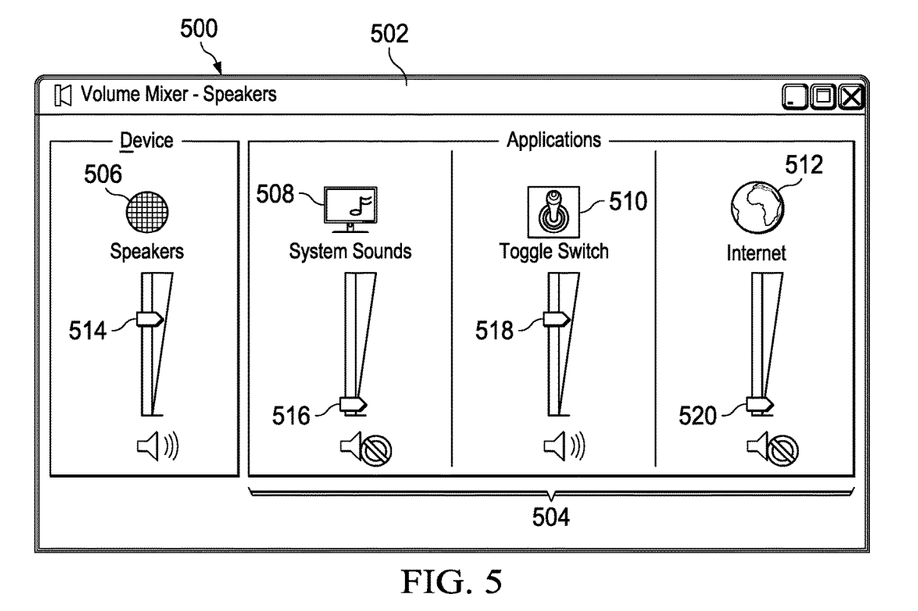
FIG. 5 is an illustration of an example of a volume mixer in accordance with an illustrative example.

Turning now to FIG. 5, an illustration of an example of a volume mixer is depicted in accordance with an illustrative example. As depicted, graphical user interface 500 shows a graphical representation of volume mixer interface 502 for a volume mixer. The interface may be for volume mixer 322 shown in block form in FIG. 3.

As can be seen, volume mixer interface 502 is used to set volume levels for sound channels 504 output by device 506. In this example, device 506 is a group of speakers. Sound channels 504 include system sounds 508, toggle switch 510, and internet 512.

As depicted, slider 514 controls the sound output of the group of speakers. In this example, slider 516 controls system sounds 508, slider 518 controls toggle switch 510, and slider 520 controls internet 512. As depicted, the sound levels for system sounds 508 and internet 512 are set as disabled, such that the sounds on these channels are not sent to the group of speakers. The sound level for toggle switch 510 is set such that the sound for this virtual control in the form of a toggle switch is sent to the group of speakers of this sound channel.

As a result, the sound for the virtual control is sent to the group of speakers without interference from other sounds that may be generated on the computer on which the simulator controller runs to generate the sound for the virtual control. In other words, operating system-generated sounds and sounds from other applications not relevant to the simulation are not output by the group of speakers for the simulator.

The illustration of the display of the control panel with virtual switches in FIG. 4 and the volume control in FIG. 5 are provided as examples and not meant to limit the manner in which different illustrative examples may be implemented. For example, other numbers and types of switches may be displayed on control panel 400 in place of or in addition to the toggle switches represented by virtual switches 402 on control panel 400. For example, sliders, rotary switches, push buttons, or other controls may be displayed on control panel 400.

As another example, volume mixer interface 502 may be omitted in some examples. The volume mixing may be program code, hardware, or some combination thereof that sets the volume levels for the sound channels using values for the volume levels that are preset. The values may be located in a configuration file that the simulator controller uses to control the volume mixer in outputting a sound for a virtual switch.

Figure 6:
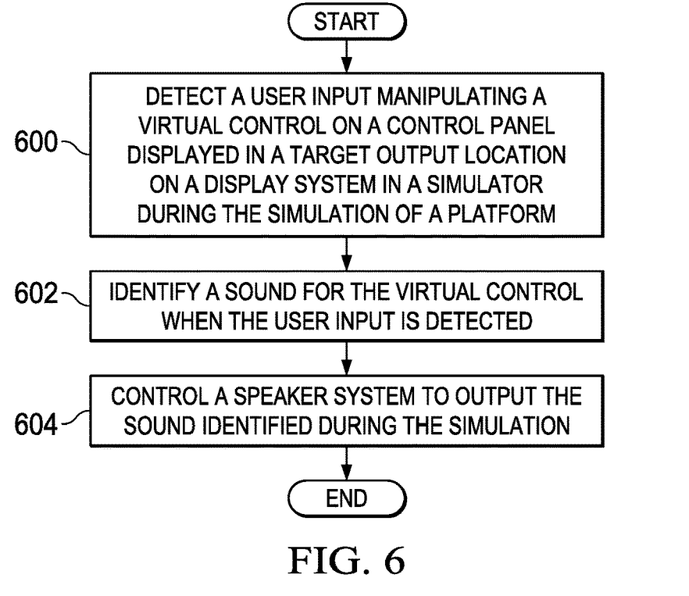
FIG. 6 is a flowchart of a process for managing a simulation in accordance with an illustrative example.

Turning next to FIG. 6, a flowchart of a process for managing a simulation is depicted in accordance with an illustrative example. The process illustrated in FIG. 6 may be implemented in simulation system 202 in simulation environment 200 shown in block form in FIG. 2. For example, the process may be implemented in simulation controller 218 in simulation system 202 shown in block form in FIG. 2.

The process begins by detecting a user input manipulating a virtual control on a control panel displayed in a target output location on a display system in a simulator during a simulation of a platform (operation 600). The process identifies a sound for the virtual control when the user input is detected (operation 602). The process controls a speaker system to output the sound identified during the simulation (operation 604) with the process terminating thereafter. In operation 604, the sound is output in a manner that is perceived by a human operator to be from the target output location. The virtual control is displayed on the display system at the target output location in this example. As a result, the sound may be perceived to originate from the virtual control. The display system may be a touchscreen device in the form of an overhead panel, a part of an instrument panel at the front of a compartment, or in some other suitable location.

Figure 7:
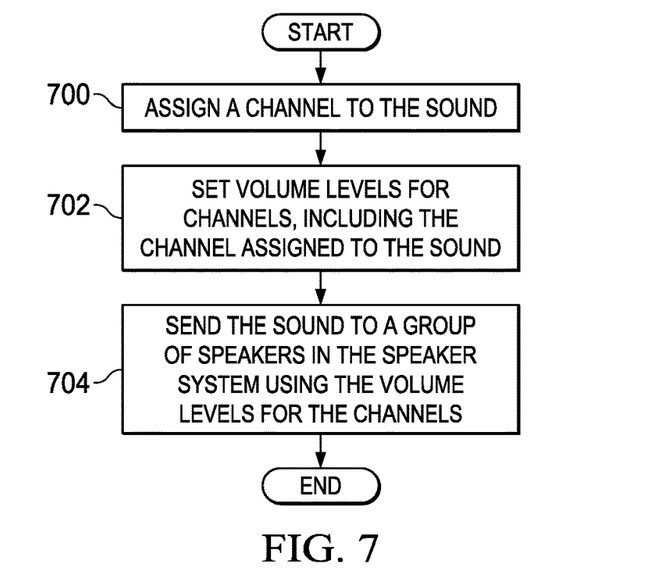
FIG. 7 is a flowchart of a process for outputting a sound for a virtual control in accordance with an illustrative example.

With reference next to FIG. 7, a flowchart of a process for outputting a sound for a virtual control is depicted in accordance with an illustrative example. The process illustrated in FIG. 7 is an example of one implementation for operation 604 in FIG. 6.

The process begins by assigning a channel to the sound (operation 700). The process then sets volume levels for channels, including the channel assigned to the sound (operation 702).

The volume levels for the channels are for sounds that may be generated by a computer system that outputs the sound for the virtual switch. In setting the volume levels for the channels, the process sets the volume level for the channel carrying the sound for the virtual control. The setting of the volume levels occurs in a manner that excludes a group of sounds that is not a part of the simulation when controlling the speaker system to output the sound for the virtual control.

The process sends the sound to a group of speakers in the speaker system using the volume levels for the channels (operation 704). The process terminates thereafter.

Thus, the reduction or exclusion of undesired sounds may be set by setting the volume levels for those channels to one where the undesired sounds are not heard, excluding those channels from being output, or some combination thereof. The group of sounds that is not a part of the simulation may include operating system sounds, sounds from other applications that are not a part of the simulation, or from other sources.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or a step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
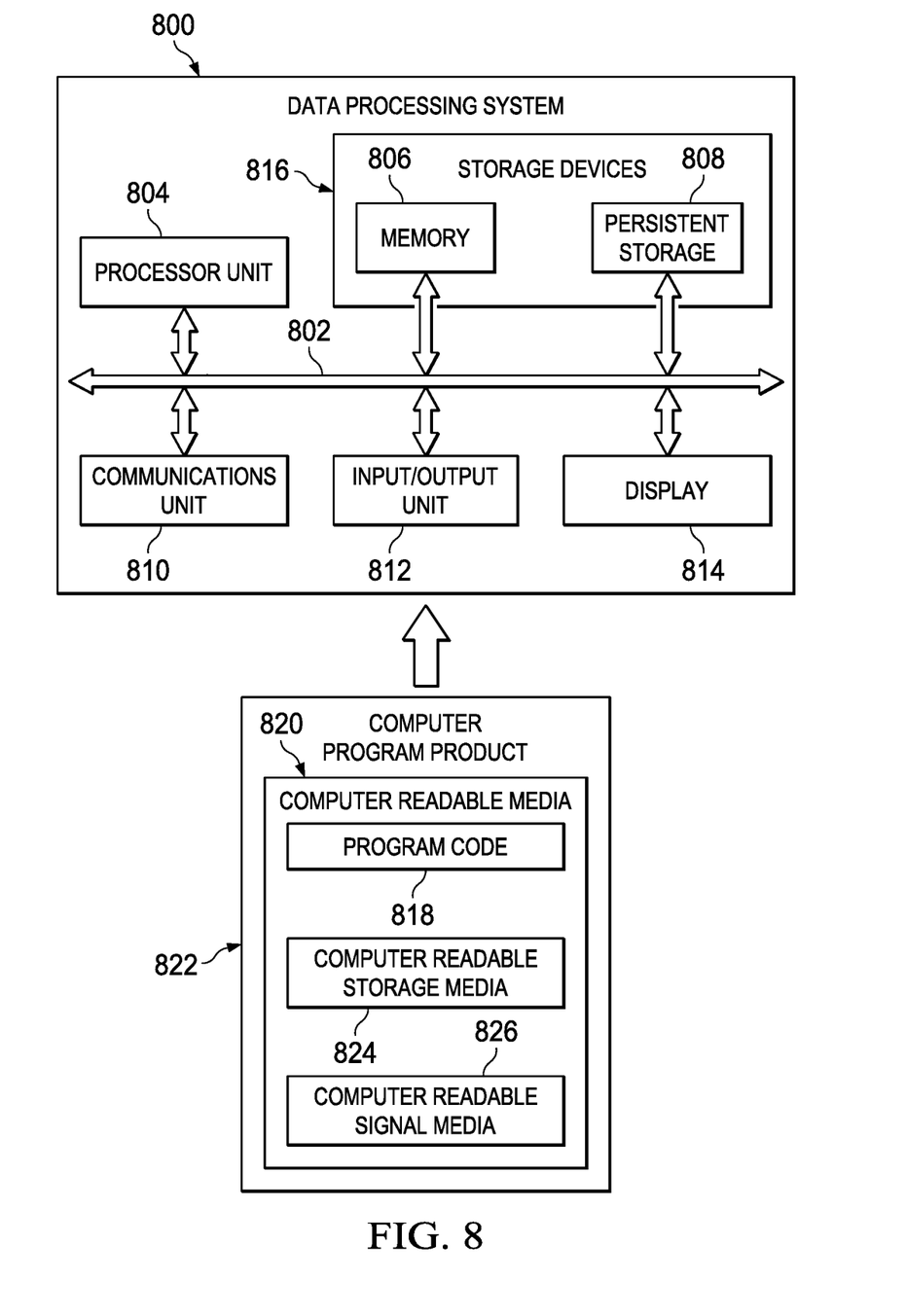
FIG. 8 is an illustration of a block diagram of a data processing system in accordance with an illustrative example.

Turning now to FIG. 8, an illustration of a block diagram of a data processing system is depicted in accordance with an illustrative example. Data processing system 800 may be used to implement one or more data processing systems in hardware 110 in FIG. 1 and one or more data processing systems in computer system 238 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different examples may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different examples may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826. In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different examples may be implemented. The different illustrative examples may be implemented in a data processing system including components in addition to or in place of those illustrated for data processing system 800. Other components shown in FIG. 8 can be varied from the illustrative examples shown. The different examples may be implemented using any hardware device or system capable of running program code 818.

Thus, one or more illustrative examples increase realism in simulations through adding sounds to virtual controls, such that the sounds are perceived to originate from the virtual controls. For example, a click sound for mechanical switches may be heard in a manner that increases the realism of the simulation. In one illustrative example, a simulator controller causes a sound to be output in a target location that corresponds to the virtual switch. The sound may be one made by a physical control displayed corresponding to the virtual control on the control panel. Further, other sounds that are not a part of the simulation may be reduced in volume or excluded when outputting the sound of a control to a speaker system, which enhances the realism and authenticity of the user experience in the simulation.

The description of the different illustrative examples has been presented for purposes of illustration and description and is not intended to be exhaustive or limited to the examples in the form disclosed. The different illustrative examples describe components that perform actions or operations. In an illustrative example, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A simulation system comprising:
a display system having a target output location at which a control panel is displayed for a simulation of a platform;
a speaker system;
a computer in a first location remote from a second location of the display system and the speaker system, wherein the computer is responsible for controlling an operation of the display system and the speaker system;
a volume mixer configured to reduce a volume of a first sound that is not associated with the simulation system; and
a simulation controller that detects a user input manipulating a virtual control on the control panel during the simulation of the platform; identifies a second sound for the virtual control when the user input is detected; and controls the speaker system to output the second sound identified during the simulation in a manner such that the speaker system creates an impression that the second sound originates from the target output location.

2. The simulation system of claim 1 further comprising:
a simulator having a shape that can hold a human operator inside the simulator for the simulation of the platform, wherein the control panel is displayed inside the simulator.

3. The simulation system of claim 1, wherein the second sound is a mechanical sound made by a physical control simulated by the virtual control.

4. The simulation system of claim 1, wherein the simulation controller excludes a group of sounds that is not a part of the simulation when controlling the speaker system to output the second sound for the virtual control.

5. The simulation system of claim 1, wherein the second sound is played on a sound channel and wherein in controlling the speaker system to output the second sound in the manner that creates the impression that the second sound originates from the target output location, the simulation controller controls the volume mixer for sound channels to output the second sound in the sound channel with a volume level such that the second sound for the virtual control appears to originate from the target output location at which the control panel is displayed.

6. The simulation system of claim 1, wherein in controlling the speaker system to output the second sound in the manner that creates the impression that the second sound originates from the target output location, the simulation controller employs a virtual surround system to output the second sound from the speaker system in the manner that creates the impression that the second sound originates from the target output location.

7. The simulation system of claim 1, wherein the speaker system includes a group of speakers located proximate to the target output location, wherein in controlling the speaker system to output the second sound in the manner that creates the impression that the second sound originates from the target output location, the simulation controller sends the second sound to the group of speakers.

8. The simulation system of claim 1, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a manufacturing facility, and a building.

9. The simulation system of claim 1, wherein the user input is generated by a group of input devices selected from one of a mouse, a keyboard, a trackball, a touchscreen, a stylus, a motion sensing input device, and a cyberglove.

10. The simulation system of claim 1, wherein the second sound is one made by a physical control displayed corresponding to the virtual control on the control panel.

11. The simulation system of claim 1, wherein the virtual control is selected from one of a switch, a toggle, a push button, a pull-out button, a selector switch, a vertical slider, a horizontal slider, a vertical lever, a horizontal lever, a rotary knob, and a three-way switch.

12. An aircraft simulation system comprising:
a flight deck simulator having a configuration that can hold a human operator for a simulation of an aircraft;
a display system associated with an interior of the flight deck simulator, wherein the display system has a target output location at which a control panel is displayed for the simulation of the aircraft;
a speaker system;
a first computer in a first location remote from a second location of the display system and the speaker system, wherein the first computer is responsible for controlling an operation of the display system and the speaker system;
a volume mixer associated with a second computer configured to reduce a volume of a first sound that is not associated with the aircraft simulation system; and
a simulation controller that detects a user input manipulating a virtual control on the control panel during the simulation of the aircraft; and identifies a second sound for the virtual control, wherein the second sound is one made by a manipulation of a physical version of the virtual control, controlling the speaker system to output the second sound in a manner that creates an impression that the second sound originates from the target output location where the control panel is displayed.

13. A method for managing a simulation, the method comprising:
detecting a user input manipulating a virtual control on a control panel displayed in a target output location on a display system in a simulator during the simulation of a platform; identifying a first sound for the virtual control when the user input is detected;
configuring a volume mixer to reduce a volume of a second sound that is not associated with the simulation; and
configuring a computer to control a speaker system to output the first sound identified during the simulation in a manner that creates an impression that the first sound originates from the target output location.

14. The method of claim 13, wherein the simulator has a shape that can hold a human operator inside the simulator for the simulation of the platform, wherein the control panel is displayed inside the simulator.

15. The method of claim 13, wherein the first sound is a mechanical sound made by a physical control simulated by the virtual control.

16. The method of claim 13 further comprising:
excluding a group of sounds that is not a part of the simulation when controlling the speaker system to output the first sound for the virtual control.

17. The method of claim 13, wherein the first sound is played on a sound channel and wherein in controlling the speaker system to output the first sound in the manner that creates the impression that the first sound originates from the target output location, a simulation controller controls the volume mixer for sound channels to output the first sound in the sound channel with a volume level such that the first sound for the virtual control appears to originate from the target output location at which the control panel is displayed.

18. The method of claim 13, wherein controlling the speaker system to output the first sound in the manner that creates the impression that the first sound originates from the target output location comprises:
employing a virtual surround system to output the first sound from the speaker system in the manner that creates the impression that the first sound originates from the target output location.

19. The method of claim 13, wherein the speaker system includes a group of speakers located proximate to the target output location, wherein in controlling the speaker system to output the first sound in the manner that creates the impression that the first sound originates from the target output location, a simulation controller comprises:
sending the first sound to the group of speakers.

20. The method of claim 13, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a manufacturing facility, and a building.

21. The method of claim 13, wherein the user input is generated by a group of input devices selected from one of a mouse, a keyboard, a trackball, a touchscreen, a stylus, a motion sensing input device, and a cyberglove.

22. The method of claim 13, wherein the first sound is one made by a physical control displayed corresponding to the virtual control on the control panel.

23. The method of claim 13, wherein the virtual control is selected from one of a switch, a toggle, a push button, a pull-out button, a selector switch, a vertical slider, a horizontal slider, a vertical lever, a horizontal lever, a rotary knob, and a three-way switch.

24. The simulation system of claim 1 further comprising a simulator, wherein:
the speaker system is located outside of the simulator;

the display system and the target output location are located directly above a user;

the virtual control is shaped as a switch;

the simulation system is connected to the computer using a wired connection; and the volume mixer is associated with the computer, and consists of a first sound channel, a second sound channel, and a third sound channel, wherein the first sound channel is configured to control a first volume level associated with an internet, the second sound channel is configured to control a second volume level associated with the computer, and the third sound channel is configured to control a third volume level associated with the virtual control.

* * * * *